United States Patent
Del Gaudio et al.

(10) Patent No.: US 10,927,247 B2
(45) Date of Patent: Feb. 23, 2021

(54) METHOD FOR INHIBITING THE PERMEATION OF WATER IN AN EXTRACTION WELL OF A HYDROCARBON FLUID FROM AN UNDERGROUND RESERVOIR

(71) Applicant: ENI S.p.A., Rome (IT)

(72) Inventors: Lucilla Del Gaudio, San Donato Milanese (IT); Roberto Lorefice, Vizzolo Predabissi (IT); Massimo Silvio Morbidelli, Rocca d'Arazzo (IT); Davide Moscatelli, Arese (IT)

(73) Assignee: ENI S.p.A., Rome (IT)

( * ) Notice: Subject to any disclaimer, the term of this patent is extended or adjusted under 35 U.S.C. 154(b) by 44 days.

(21) Appl. No.: 15/565,813

(22) PCT Filed: Apr. 13, 2016

(86) PCT No.: PCT/IB2016/052089
§ 371 (c)(1),
(2) Date: Oct. 11, 2017

(87) PCT Pub. No.: WO2016/166672
PCT Pub. Date: Oct. 20, 2016

(65) Prior Publication Data
US 2018/0134887 A1  May 17, 2018

(30) Foreign Application Priority Data

Apr. 13, 2015 (IT) .......................... 102015000011666

(51) Int. Cl.
*C08L 33/02* (2006.01)
*C08F 220/06* (2006.01)
*C08L 33/06* (2006.01)
*E21B 43/00* (2006.01)
*C09K 8/502* (2006.01)
*E21B 43/16* (2006.01)
*C08F 220/56* (2006.01)
*C08L 33/26* (2006.01)
*C08F 220/28* (2006.01)

(52) U.S. Cl.
CPC ............ *C08L 33/02* (2013.01); *C08F 220/06* (2013.01); *C08L 33/06* (2013.01); *C09K 8/502* (2013.01); *E21B 43/00* (2013.01); *E21B 43/16* (2013.01); *C08F 220/286* (2020.02); *C08F 220/56* (2013.01); *C08F 2800/20* (2013.01); *C08L 33/26* (2013.01); *C08L 2201/52* (2013.01); *C08L 2201/56* (2013.01); *C09K 2208/10* (2013.01)

(58) Field of Classification Search
CPC ........ C08L 33/02; C08L 220/06; C08L 33/06; E21B 43/00; E21B 43/16; C09K 8/502; C09K 2208/10
See application file for complete search history.

(56) References Cited

U.S. PATENT DOCUMENTS

| | | | | |
|---|---|---|---|---|
| 4,182,417 A | * | 1/1980 | McDonald | ............. C09K 8/512 166/295 |
| 2012/0261120 A1 | * | 10/2012 | Del Gaudio | ............ E21B 43/16 166/270.1 |
| 2013/0312967 A1 | | 11/2013 | De Ghetto et al. | |

FOREIGN PATENT DOCUMENTS

| | | |
|---|---|---|
| CN | 102753647 A | 10/2012 |
| CN | 103384709 A | 11/2013 |
| CN | 103443239 A | 12/2013 |
| CN | 103998567 A | 8/2014 |
| WO | WO 2012/013877 A1 | 2/2012 |
| WO | WO 2012/090153 A1 | 7/2012 |

OTHER PUBLICATIONS

International Search Report and Written Opinion dated May 25, 2016 in PCT/IB2016/052089.
Combined Office Action and Search Report dated Mar. 4, 2019 in Chinese Patent Application No. 201680029823.4, 16 pages (with English translation).

* cited by examiner

*Primary Examiner* — Crystal J Miller
(74) *Attorney, Agent, or Firm* — Oblon, McClelland, Maier & Neustadt, L.L.P.

(57) ABSTRACT

A method for inhibiting the permeation of water in an extraction well of a hydrocarbon fluid from an underground reservoir is described. The method includes the injection of at least one treatment fluid into the underground reservoir. The treatment fluid contains at least one emulsion or dispersion in an organic solvent of at least one copolymer of a first monomer of an acrylic monomer or a methacrylic monomer, and a second monomer having at least one ethylene unsaturation and at least one polyoxyethylene chain. The emulsion or dispersion of the copolymer used in the method is also described.

14 Claims, No Drawings

METHOD FOR INHIBITING THE PERMEATION OF WATER IN AN EXTRACTION WELL OF A HYDROCARBON FLUID FROM AN UNDERGROUND RESERVOIR

The present invention relates to a method for inhibiting the permeation of water in an extraction well of a hydrocarbon fluid from an underground reservoir.

In particular, the present invention relates to a method for inhibiting the permeation of water in an extraction well of a hydrocarbon fluid from an underground reservoir which comprises the injection into the reservoir of a treatment fluid containing at least one chemical compound capable of selectively absorbing the reservoir water present herein, blocking its permeation into the extraction well. The treatment fluid is formulated such that the injected compound interacts only with the reservoir water and not with the irreducible water, so as to not affect the mobility of the hydrocarbon fluid.

For the aims of the present invention, the term "hydrocarbon fluid" refers to a fluid containing hydrocarbons or mainly hydrocarbons, in a gaseous state, liquid, or in the form of gas-liquid mixture, having a natural origin, and present in an underground or submarine rock formation, such as a hydrocarbon oil or a natural gas. The hydrocarbon oil can possibly contain water in a dispersed or emulsified form. Hereinafter of the present invention, the terms "hydrocarbon oil" and "oil" are alternatively used.

For the aims of the present invention, the term "irreducible water" refers to the fraction of water present either into the pores of a rock formation containing a hydrocarbon fluid or into the spaces comprised between the rock grains which constitute such formation; the irreducible water, mainly held into the formation due to the effect of surface tension forces, is not substantially removed during the fluid extraction from the rock formation.

For the purposes of the present invention, the term "reservoir water" refers to the fraction of water present within a rock formation containing a hydrocarbon fluid, that can be removed during the extraction of the fluid from the rock formation. The reservoir water can be formed, for example, due to water infiltration from an aquifer located near the reservoir or from the injections of water or vapour in the subsoil carried out in order to displace the fluid towards the extraction well.

According to the present invention, the verb "to comprise" and all its derived terms, as used both in the description and claims herein, also include the meaning of the verb "to consist" and of all its derived forms.

The presence of water in association with a hydrocarbon fluid extracted from an underground reservoir represents a huge economic problem in the field of oil extraction.

The extraction of a hydrocarbon fluid in mixture with water reduces the extraction efficiency of the fluid itself, increases both costs and dimensions of equipment necessary for water separation, increases the total costs related to fluid extraction, and finally, raises the problem of disposing the separated water, which is contaminated by hydrocarbons.

The extraction of water together with the hydrocarbon fluid from an oil well, as well as implicating frequent interruptions in the extraction operations in order to allow the implementation of water permeation containment measures, in some cases it can be of an extent such as to implicate an early closure of the well, thereby preventing the complete exploitation of the oil reservoir (such as, for example, when the oil reservoir is located near an aquifer).

In the state of the art, different techniques for reducing water extraction from an oil well are well-known. One of the these techniques provides the injection of chemical compounds into the reservoir rock formation, such as polymers, gel and foams, capable of creating a mechanical barrier which is impermeable to water, thereby blocking its preferential paths into the rock formation towards the extraction well. Generally, the mechanical barrier is obtained by reacting in situ two or more reagents, separately injected, which form a barrier compound.

U.S. Pat. No. 3,965,986, for example, discloses a method for increasing the oil well productivity based on reducing water permeability of selected layers of the reservoir rock formation. The reduction of water permeability of a determined layer of the rock formation is obtained through a first injection of an aqueous dispersion of colloidal silica into the layer, followed by a second injection of an aqueous solution containing a surfactant. The contact between the aqueous solution containing the surfactant and the colloidal silica leads to the formation of a gel that blocks the rock formation pores of the layer, so reducing the permeability to water of the layer.

WO 2012/090153 discloses a method for reducing the "water coning" and "gas coning" phenomena into an extraction well of a hydrocarbon fluid from an underground reservoir located in proximity of an aquifer or of cap gas.

The method comprises the injection of a treatment fluid into the aquifer (or into the cap gas)-containing an active ingredient—having an intermediate density between the density of hydrocarbon fluid to be extracted and water (or cap gas). Due to the different density, the treatment fluid spontaneously migrates up to the contact interface between the hydrocarbon fluid and the water (or cap gas). The active ingredient contained into the fluid is activated in situ, forming compounds capable of forming a barrier impermeable to water in the contact interface. According to one embodiment, the method disclosed in WO 2012/090153 provides the injection of a first treatment fluid comprising an oil-in-water or a water-in-oil emulsion, in which the active ingredient is a monomer (eg. amide, acrylamide, etylene glycol) or a pre-polymer (polyamide, polyacrylamide, polyethylene glycol) contained in the dispersed organic phase of the emulsion. A second treatment fluid containing a polymerization initiator is then injected into the same point of the reservoir in order to trigger the polymerization of the monomer or of the pre-polymer (activation in situ) and forming a barrier impermeable to water.

The methods known in the art have several drawbacks. Firstly, the effect of water permeation reduction into the extraction wells is short-lasting. This implies frequent interruptions of the extraction activity in order to allow further injections of the treatment fluid into the reservoir with a consequent reduction of the production capacity.

Secondly, the compounds injected according to the methods known in the prior art have a low selectivity towards the reservoir water. Such compounds, in fact, can also interact with the irreducible water or also with dispersed water or water emulsified-in-oil, also causing a reduction in the fluid mobility and, therefore, of the extraction yield thereof.

Thirdly, the effects regarding the application of the methods for inhibiting the permeation of water according to the prior art are irreversible. Possible mistakes in the injection of the treatment fluid can therefore imply serious economic damage (eg. the early closure of the extraction well).

Taking into consideration the above-mentioned state of the art, the Applicant addressed the primary objective of providing a method for effectively inhibiting the permeation of water into an extraction well of a hydrocarbon fluid, so as to reduce the interruptions of the extraction activity and to increase the hydrocarbon fluid productivity.

Under this objective, one aim of the present invention is to provide a method for inhibiting the permeation of water into an extraction well of a hydrocarbon fluid capable of reducing the quantity of extracted water, thereby reducing the drawbacks related to the activity of water separation from the fluid and the disposal of water contaminated by hydrocarbons.

The second aim of the present invention is to provide a method for inhibiting the permeation of water in an extraction well of a hydrocarbon fluid, which is effectively usable in reservoirs characterized by rock formations having different geological features.

The Applicant has now found that such aims and other aims, which will be better illustrated in the following disclosure, can be achieved by a method for inhibiting the permeation of water into an extraction well of a hydrocarbon fluid from an underground reservoir which comprises:

a) injecting into said reservoir, at least one treatment fluid comprising at least one emulsion or a dispersion in an organic solvent of at least one copolymer from:
  a first monomer selected from an acrylic monomer or methacrylic monomer, and
  a second monomer comprising at least one ethylene unsaturation and at least one polyoxyethylene chain.

According to a second aspect, the present invention concerns an emulsion or a dispersion in an organic solvent of at least one copolymer from:
  a first monomer selected from an acrylic monomer or methacrylic monomer, and
  a second monomer comprising at least one ethylene unsaturation and at least one polyoxyethylene chain.

The method according to the present invention allows to increase the extraction efficiency of a hydrocarbon fluid, such as a hydrocarbon oil or natural gas, from an underground reservoir.

The method according to the present invention can be advantageously used to enhance the extraction efficiency both of a liquid fluid, such as a hydrocarbon oil, and of a gaseous fluid, such as a natural gas.

The method according to the present invention is based on the injection into the reservoir of a treatment fluid containing a polymer capable of selectively interacting with the reservoir water present in order to increase its viscosity and, accordingly, preventing or at least slowing down the permeation up to the extraction well of the hydrocarbon fluid.

The method of the invention may be applied to rock formations having different geological features.

Particularly, the method is suitable for reducing water permeation into rock formations mainly fractured or rock formations mainly porous.

The treatment fluid injected into the reservoir comprises at least one organic solvent and at least one organic polymer. The organic polymer is a polymer substantially insoluble in water and with a high tendency to water absorption. The contact between the polymer and water causes the polymer swelling with the formation of a three-dimensional structure (hydrogel).

The polymers usable for the aims of the present invention are copolymers obtained by the polymerization of at least one first acrylic monomer (main monomer) with at least one second monomer comprising at least one ethylene unsaturation and at least one polyoxyethylene chain (co-monomer).

These copolymers have a high capability of absorbing water and they are stable at temperature and salinity conditions of water typical of an oil or natural gas reservoir (e.g. temperature within the range of 50-90° C.)

Particularly, the above-said copolymers, once having absorbed water and formed the hydrogel, can resist to the prolonged contact with high salt-content water, without undergoing a significant structural degradation.

The main monomer is a monomer comprising at least one acrylic or methacrylic functional group.

Preferably, the main monomer is selected from acrylic acid and methacrylic acid.

Preferably the acid carboxylic groups of the acrylic or methacrylic acid are at least partially neutralized, for example with metal ions, such as ions of alkaline and alkaline-earth metals or transition metal ions.

Preferably, the amount of carboxylic groups of the acrylic or methacrylic acid neutralized is equal to 50%-90% of the carboxylic groups of the starting acid, more preferably equal to 55%-75%, even more preferably equal to 60-70%.

The co-monomer comprises at least one ethylene unsaturation and at least one polyoxyethylene chain.

A preferred example of co-monomer is the compound having formula (I) reported below

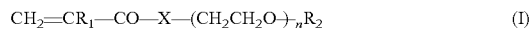

$$CH_2=CR_1-CO-X-(CH_2CH_2O)_n R_2 \quad (I)$$

wherein:
$R_1$ is H or $CH_3$;
$R_2$ is selected from: H, $C_1$-$C_4$ alkyl, or an acrylate group $COCR_3=CH_2$ wherein $R_3$ is H or $CH_3$;
X is O or NH;
n is an integer ranging from 1 to 500, preferably ranging from 4-200, even more preferably ranging from 10-100.

According to one preferred embodiment, in the above-said formula (I) X is an oxygen atom, the co-monomer thus being an acrylate monomer.

According to another preferred embodiment, in the above-said formula (I) X is a NH group, the co-monomer thus being an acrylamide monomer.

According to a particularly preferred embodiment, the monomer of formula (I) has only one ethylenic unsaturation, namely in the monomer of formula (I) $R_1$ is $CH_3$, $R_2$ is selected from H and $C_1$-$C_4$ alkyl, X is O or NH, preferably O, and n is an integer within the range of 4-50.

The class of monomers of general formula (I) wherein X represents O and $R_1$ represents $CH_3$ is known in the prior art also with the name of 2-hydroxyethyl methacrylate-PEG (HEMA-PEG).

According to another preferred embodiment, the co-monomer of formula (I) is a bifunctional monomer and comprises at least two ethylenic unsaturations.

According to a further preferred embodiment, said co-monomer is a mixture of monomers of formula (I) having one ethylenic unsaturation and two ethylenic unsaturation.

Preferably, the co-monomer has a molecular weight within the range of 200 Da-10000 Da, more preferably within the range of 500 Da-5000 Da, even more preferably within the range 1000 Da-4000 Da. In the present description the polymer molecular weights are expressed as average value by weight (Mw), determinable for example by gel-permeation chromatography (GPC).

The organic solvent of the treatment fluid has the function to carry the copolymer within the rock formation up to bring it into contact with the reservoir water, by crossing the hydrocarbon oil possibly present.

The organic solvent usable for the aims of the present invention is substantially insoluble in water and soluble or partially soluble in oil. The term "substantially insoluble in water" means that the organic solvent has a water solubility at 25° C. lower or equal to 5 g/L, preferably lower or equal to 1 g/L. The term "partially soluble in oil" means that the organic solvent has a solubility in oil at 25° C. equal to or higher than 100 g/L.

Preferably, the solvent is in the liquid state within the operating temperature range, particularly within the range between −5° C. and 90° C. The solvent may be polar or, preferably, non-polar.

Preferred examples of solvents usable for the aims of the present invention are: $C_6$-$C_{25}$ hydrocarbon solvents, more preferably $C_{10}$-$C_{15}$, aliphatic or aromatic (e.g. kerosene); amides with a total number of carbon atoms from 7 to 25; alcohols with a total number of carbon atoms from 7 to 25; ethers with a total number of carbon atoms from 7 to 25 (e.g. diexyl ether, dioctyl ether, diphenyl ether); esters with a total number of carbon atoms from 7 to 25; ketones with a total number of carbon atoms from 7 to 25.

The hydrocarbon solvents are particularly preferred, such as, for example, solvents commercially available with the name of LAMIX 30® (mixture of $C_{11}$-$C_{14}$ hydrocarbons containing n-alkanes, isoalkanes, cyclic hydrocarbons (aromatic hydrocarbon content lower than 2% by weight of the mixture)) and Versalis E-solv G® (mixture of aliphatic and aromatic hydrocarbon solvents).

Other examples of solvents are: naphthas, kerosene cuts, diesel and biodiesel cuts, aromatic solvents such as xylene, toluene and tetraline.

The treatment fluid can comprise a mixture of two or more organic solvents.

According to a preferred embodiment of the present invention, the treatment fluid is a water-in-oil emulsion (so-called inverse emulsion).

The inverse emulsion comprises at least one water-based discontinuous phase and a oily-based continuous phase. The discontinuous phase is dispersed in the continuous phase in the form of drops.

In the inverse emulsion according to the present invention, the oily continuous phase comprises the organic solvent or organic solvent mixture which acts as carrying agent of the absorbing polymer. Instead, the discontinuous aqueous phase comprises a water-based fluid at least partially immiscible in the continuous phase and at least one copolymer capable of absorbing water.

The average particle diameter of the copolymer in the inverse emulsion is preferably comprised within the range of 10-500 nanometers, more preferably within the range of 50-300 nanometers for applications in porous matrix formations.

In order to avoid the discontinuous phase drops to be coalesced each other causing an undesired increase of their sizes, the inverse emulsion can contain one or more emulsifying agents. Preferably, the emulsifying agents are surfactant compounds, preferably non-ionic or anionic surfactants, many of which are commercially available products.

The treatment fluid in the form of inverse emulsion is preferably used for inhibiting water permeability in a reservoir in which the rock formation is mainly of the porous type. Through the inverse emulsion, the polymer particles having nanoscale dimensions can be carried up to within the pores of the rock formation. The discontinuous phase droplets containing the polymer, thanks to the substantial miscibility of the organic solvent with the hydrocarbon oil, may migrate through the latter, where present in the rock formation, up to be in contact with the reservoir water, without undergoing substantial alterations.

The contact with water causes the inversion of the inverse emulsion and therefore the release of copolymer particles, which absorb water so forming a hydrogel in situ. The hydrogel formation causes the immobilization of water absorbed into the rock formation, thus slowing or arresting the flow towards the extraction well.

Furthermore, the hydrogel particles interact with each other by binding each other, thus forming a layer which acts as barrier against the water flow.

As in order to achieve the inverse emulsion it is necessary that the droplets of the discontinuous phase come into contact with a relatively high quantity of water, the contact between the droplets and the irreducible water (present in the contact interface with oil in a discontinuous form and in a much smaller quantity than the water reservoir) or with the possible dispersed or in-oil-emulsified water, does not cause the polymer release. Therefore the treatment fluid selectively acts against the reservoir water, being active only in the points of the rock formation in which the water/oil ratio is enough high.

The inverse emulsion containing the polymer particles may be prepared according to techniques known to the person skilled in the art.

According to a preferred preparation method, the inverse emulsion may be obtained by dropping a discontinuous aqueous phase—which includes an aqueous solution of at least one main monomer, a co-monomer and a polymerization initiator—into a continuous oily phase comprising at least one organic solvent. The discontinuous phase is dropped into the continuous phase, maintaining the latter under sonication (for example, by a ultrasonic sonicator) or under mechanical stirring (for example, by a static mixer).

Preferably, the ratio between the weight of the discontinuous phase and the total weight of the inverse emulsion is within the range of 5%-50%.

Preferably, the ratio between the weight of the co-monomer and the weight of the main monomer is within the range of 5%-50%, preferably within the range of 10%-35%, even more preferably within the range of 20%-30%.

In the presence of the polymerization initiator, the monomer and the co-monomer react thus forming copolymer particles which are entrapped within the drops which form the discontinuous phase of the emulsion.

The maximum value of the average diameter of the polymer particles can be maintained within a desired range of values by regulating the sonication energy or the shear stresses in a mechanical stirrer.

The polymerization initiator is preferably a soluble or dispersible in water compound. Examples of initiators usable for the aims of the present invention are: molecules of halogen atoms, hydroperoxides, azo-compounds and persulfates.

The redox initiators are particularly preferred. The redox initiators comprise two compounds capable of reacting each other by a oxidation-reduction reaction (redox reaction), generating the radicals necessary for starting the polymerization reaction. An example of redox couple usable as polymerization initiator is the couple of persulfate/metabisulfite ions.

The polymerization reaction started by a redox couple occurs preferably at a temperature within the range of 0-30° C.

The polymerization reaction may be started also by using an initiator activable by a temperature increase.

The polymerization reaction started by the temperature increase preferably occurs at a temperature within the range of 30° C.-120° C. depending on the type of initiator used.

In order to increase the structural resistance of the polymer to the conditions of use in the reservoir, the polymer is preferably cross-linked. For such purpose, the inverse emulsion also comprises a cross-linking agent, which is preferably added to the aqueous discontinuous phase.

The cross-linking agents can be selected from the compounds capable of crosslinking the monomers and co-monomers selected for the preparation of the copolymer.

Preferred cross-linking agents are: N,N'-methylen-bis-acrylamide, ethylenglycol-dimethacrylate, divinylbenzene, polyethylenglycol diacrylate, 1,4-butanediol diacrylate, trimethylpropane triacrylate, 1,4-bis(4-vinylphenoxy)butane, bis(2-methacryloyl)oxyethyl disulfide.

The copolymer cross-linking degree may be varied, by regulating the cross-linking agent concentration in the formulation.

Preferably, the ratio between the weight of the cross-linking agent and the total weight of the monomers (main monomer+co-monomer) is within the range of 0.2%-1%, preferably within the range of 0.5%-0.9%.

The continuous phase, the discontinuous phase or both can comprise also at least one emulsifying agent in order to stabilize the emulsion.

Preferably, the emulsifying agent is a surfactant. Preferably the emulsifying agent is added at least to the oily continuous phase.

The emulsifying agents are present in the inverse emulsion preferably in a total concentration within the range of 2.5%-50% by weight with respect to the weight of the inverse emulsion, preferably within the range of 10%-30% by weight.

In order to regulate the emulsion stability by adding surfactants, two or more surfactants having different values of HLB (Hydrofilic-Lipofilic Balance) can be advantageously used. By varying the ponderal ratio of surfactants in the formulation, the desired HLB value can be obtained. Preferably, the HLB value of an inverse emulsion containing surfactants is within the range of 4-15, more preferably within the range of 8-12.

The emulsifying agents can also promote the emulsion inversion and therefore the copolymer release by contact with water. To this purpose, at least one surfactant, preferably an anionic surfactant, is added to the discontinuous aqueous phase together with monomers. Preferably, the amount of surfactant present in the discontinuous aqueous phase is within the range of 0.1%-5% by weight with respect to the total weight of surfactants present in the emulsion, more preferably in the range 1%-3% by weight.

According to a second preferred embodiment, the treatment fluid is in a copolymer particle dispersion in at least one organic solvent.

The organic solvent is selected from those previously described for the case of the inverse emulsion.

The dispersion can be prepared according to methods known in the state of the art.

According to a preferred preparation method, the dispersion containing the copolymer may be prepared by the suspension polymerization technique. This technique is described for example in:

*Dispersion polymerization in polar-solvents.* (SAENZ, J M); ASUA, J M (ASUA, J M). JOURNAL OF POLYMER SCIENCE PART A-POLYMER CHEMISTRY;

*Dispersion copolymerization of styrene and butyl acrylate in polar solvents.* Saenz, J M (Saenz, J M); Asua, J M (Asua, J M), JOURNAL OF POLYMER SCIENCE PART A-POLYMER CHEMISTRY

*An updated review on suspension polymerization.* Vivaldo-Lima, E (VivaldoLima, E); Wood, P E (Wood, P E); Hamielec, A E (Hamielec, A E); Penlidis, A (Penlidis, A). INDUSTRIAL & ENGINEERING CHEMISTRY RESEARCH;

*Superabsorbent polymer materials: A review.* Zohuriaan-Mehr, M J (Zohuriaan-Mehr, Mohammad J.)[1]; Kabiri, K (Kabiri, Kourosh)[1]. IRANIAN POLYMER JOURNAL.

Preferably, the average diameter of the copolymer particles in the dispersions according to the present invention, such as obtainable by suspension polymerization, is comprised within the range of 1-1000 micrometers, preferably within the range of 5-500 micrometers, more preferably within the range of 10-200 micrometers.

Considering the micrometer sizes of particles, the polymer particles in the dispersions have the tendency to settle if not kept under stirring. Such behaviour may be advantageously used for inhibiting water permeation in an extraction well placed in a fractured rock formation. The micrometer sizes of the polymer particles, in fact, are comparable with the sizes of fractures in the above-said rock formation. Therefore, the polymer particles can penetrate into the fractures, by crossing the oil possibly present, up to reach the interface between this and water.

It was in fact surprisingly found that during the sedimentation through the oil, the polymer remains substantially unchanged, not interacting, on times required for the sedimentation, neither with the possible irreducible water, nor with the possible water present in dispersed or in-oil-emulsified form. Once the polymer came into contact with the reservoir water, it performs its absorbing action toward the continuous-mass water with which the polymer comes into contact.

Therefore, even in the case of dispersions in organic solvent, the release of the polymer occurs in a selective manner only in those reservoir points wherein water reservoir is present. While not wishing to formulate any theory, it is believed to be possible as the dispersed or in-oil-emulsified water does not interact with the micrometric particles in sufficient quantity to activate the frost forming process. Particularly advantageous results are achieved when the concentration of dispersed or in-oil-emulsified water is preferably comprises between 0 and 50%, more preferably between 0 and 30% by weight, even more preferably between 0 and 20% by weight.

The use of micrometric particles is also associated with a higher efficiency in transferring the polymer to the reservoir water.

Furthermore, through the process of suspension polymerization, it is possible to obtain much more concentrated dispersions (up to 50% by weight) with respect to those produced through emulsion polymerization (up to 5% by weight).

The method according to the present invention can be applied both before starting the extraction of the hydrocarbon fluid from an oil reservoir and when the well is already under production, namely when its exploitation has already started.

In particular, the method can be advantageously applied to the extraction wells so-called "mature", namely to the wells that had reached the limit of their production capacity, and which are characterized by the extraction of significant amounts of water in association with the hydrocarbon fluid.

The injection of the treatment fluid into a reservoir can be carried out through the devices and according to the techniques well-known in the field of oil extraction industry.

The injection of the treatment fluid into the reservoir can be carried out both through the extraction well of the hydrocarbon fluid and through the other wells generally present in an oil field, such as wells for the injection of vapour, water or other fluids into the subsoil (the so called injector wells).

The method according to the present invention therefore can be used in the context of secondary and tertiary activities of hydrocarbon fluid recovery, both in the water shut-off treatments and in the conformation treatments.

The amounts of treatment fluid to be injected can widely vary depending on the specific geological conformation of the reservoir.

The fluid amount to be injected can be simply determined by the person skilled in the art based on the geological features of the reservoir and of simple routine experimental trials, as it usually happens in this field.

The injection of the treatment fluid possibly can be followed by the injection of a displacement fluid (for example, the same organic solvent used for preparing the copolymer dispersion or the water in oil emulsion containing the copolymer), so as to promote the penetration of the treatment fluid into the rock formation of the reservoir.

At the end of the injection of the treatment fluid and possibly of the displacement fluid, the extraction of the hydrocarbon fluid from the well can be started or resumed. Preferably, before starting the extraction of the hydrocarbon fluid, a sufficient period of time, for allowing to the treatment fluid to release the polymer particles when the latter have come into contact with the reservoir water and thus achieving the desired effect of water mobility inhibition, is to be expected.

If necessary, the extraction of the hydrocarbon fluid can be interrupted in order to carried out further injections of the treatment fluid, so as to obtain a further increase in the extraction well productivity.

Advantageously, the effects of the treatment fluid injection according to the present invention are at least partially reversible. The water absorbed by hydrogels, in fact, can be expelled again from the polymers due to the contact between the hydrogels and an acid compound. The acid compound, such as a mineral acid (eg. hydrochloric acid) or an organic acid (eg. formic acid), can be injected into the reservoir by the same procedures as described for the treatment fluid.

Such property of the hydrogels according to the present invention can be exploited to avoid, at least partially, possible mistakes regarding the injection of polymers into the reservoir, for example if the polymer injections cause a deterioration in terms of oil production capacity.

The following examples are provided for purely illustrative purposes of the present invention and should not be considered as limiting the protection scope defined by the enclosed claims.

EXAMPLE 1—TREATMENT FLUID IN THE FORM OF WATER-IN-OIL EMULSION

The oily continuous phase was prepared in a three-neck flask by loading 64 g of kerosene and 1.44 g of a mixture of commercial non-ionic surfactants SPAN80 (HLB=4.3) and TWEEN80 (HLB=15.0). The weight ratio percentage between the two surfactants was selected so as to have the polymerization reaction at predetermined HLB values of the formulation to be occurred.

The discontinuous aqueous phase was prepared into a becker by mixing 6.97 g of water, 5 g of methacrylic acid and NaOH in an amount ranging as a function of the neutralization desired degree of the methacrylic acid. To the solution of neutralized methacrylic acid, 2.5 g of a 50% b.w. aqueous solution of the 2-idrossietil methacrylate monomer (HEMA-PEG of the company Sigma-Aldrich, MW=2000 Da, 42 polyoxyethylene units), 0.056 g of N,N'-methylen-bis-acrylamide and 0.239 g of ammonium persulphate (first component of a couple of redox polymerization initiators) were added.

The discontinuous aqueous phase was dropped into the oily continuous phase, so promoting the formation of the emulsion by a sonicator. The mixture temperature was maintained within the range of 0-5° C. through an ice-bath. After 20 minutes of sonication, 0.1992 g of sodium metabisulfite dissolved in 0.5 g of water (second component of the couple of redox polymerization initiators) were added. The polymerization reaction in the presence of the couple of redox initiators is carried out for 30 minutes under sonication into an ultrasonic bath.

The above-described process was used for preparing the water-in-oil emulsions having the compositions LS1-LS4 reported in table 1.

The LS5 and LS6 emulsions were prepared by the above-described procedure, wherein the polymerization reaction was carried out also in the presence of an anionic surfactant (sodium dodecyl sulfate (SDS)) in the aqueous discontinuous phase.

The particle average diameter and the polydispersity index (PDI) of the polymer in the emulsion were determined by dynamic light scattering (DLS) measures (table 2)

TABLE 1

Composition of the emulsions.

| Sample | SPAN80* (g) | TWEEN80 (g) | SDS** (g) | HLB | NaOH (g) | Neutralization degree methacrylic acid (%) |
|---|---|---|---|---|---|---|
| LS1 | 1.44 | — | — | 4.3 | 2.323 | 100 |
| LS2 | 1.211 | 0.229 | — | 6 | 2.323 | 100 |
| LS3 | 0.942 | 0.498 | — | 8 | 2.323 | 100 |
| LS4 | 0.673 | 0.767 | — | 10 | 2.323 | 100 |
| LS5 | 0.666 | 0.759 | 0.014 | n.a. | 2.323 | 100 |
| LS6 | 0.659 | 0.752 | 0.028 | n.a. | 2.323 | 100 | n.a.: not applicable, as it is present an anionic surfactant

TABLE 2

| Sample | HLB | Particle average diameter (nm) | PDI |
|---|---|---|---|
| LS1 | 4.3 | 106 | 0.10 |
| LS2 | 6 | 154 | 0.12 |
| LS3 | 8 | 164 | 0.14 |
| LS4 | 10 | 205 | 0.12 |
| LS5 | n.a. | 198 | 0.11 |
| LS6 | n.a. | 208 | 0.13 | n.a.: not applicable, as it is present an anionic surfactant

The results show that the copolymer obtained has a particle average diameter within the range of about 100-200 nm. The polydispersity index shows that particle distribution is substantially singlemode.

The emulsions obtained result to be stable.

The effect of the emulsion inversion by contact with water and the consequent polymer release was assessed by introducing the emulsion into a vial containing water in a emulsion/water volume ratio of 3:1. The test was repeated using water with different salt concentrations.

After one week of contact in static conditions, the higher oily layer present in the vial was subjected to thermogravimetric analysis in order to determine the amount of copolymer present; on the lower aqueous layer the presence of the copolymer and the related PDI were determined by DLS analysis.

Due to the contact with water, to the interface between the higher oily layer and the aqueous lower layer, it was observed the formation of a whitish layer having viscous consistency due to hydrogel particles formed after water absorption which concentrate.

The phase inversion of the emulsion was assessed by the contact with: (i) distilled acqua, (ii) "water-1" (concentration of Na+ ions=9 g/L; Ca++ ions=0.53 g/L; Mg++ ions=1.2 g/L) and (iii) "water-2" (concentration of Na+ ions=34 g/L; Ca++ ions=5.8 g/L; Mg++ ions=0.6 g/L).

The results of the contact tests carried out on the samples LS4-LS6 are reported in tables 3-5.

TABLE 3

Sample LS4

| | Particle average diameter (nm) | PDI | Particle percentage in the emulsion (%) |
|---|---|---|---|
| Distilled water | 420 | 0.29 | 49% |
| water-1 | 384 | 0.41 | 52% |
| water-2 | 230 | 0.43 | 45% |

TABLE 4

Sample LS5

| | Particle average diameter (nm) | PDI | Particle percentage in the emulsion (%) |
|---|---|---|---|
| Distilled water | 435 | 0.31 | 21% |
| water-1 | 377 | 0.39 | 18% |
| water-2 | 240 | 0.55 | 24% |

TABLE 5

Sample LS6

| | Particle average diameter (nm) | PDI | Particle percentage in the emulsion (%) |
|---|---|---|---|
| Distilled water | 460 | 0.29 | 16% |
| water-1 | 395 | 0.44 | 14% |
| water-2 | 244 | 0.52 | 15% |

The increase of the average particle diameter after the crossing into the aqueous phase is an index of the fact that the polymers were released and absorbed water.

The experimental results also show in all the cases that at least 50% of the copolymer particles migrated from the emulsion to the aqueous phase. The presence of increasing amounts of a surfactant added to the aqueous discontinuous phase containing the monomers (LS5 and LS6) significantly promotes such migration.

The PDI values in salt water are higher than values in distilled water. That shows that the presence of salts promotes the formation of aggregates between polymer particles.

EXAMPLE 2—POLYMER DISPERSION IN ORGANIC SOLVENT

A polymer particle dispersion (D1) in an organic solvent was prepared in the following way.

The oily continuous phase was prepared in a three-neck reactor by loading 404 g of Lamix 30, 5.388 g of Span 80 and 5.388 g of Atlox 4914, both being non-fat-soluble non-ionic surfactants and having steric action. The dissolution of such surfactants was ensured by mechanical stirring through an impeller. The system was brought to the reaction temperature of 70° C.

Separately, the discontinuous aqueous phase was prepared into a beaker by mixing 37.879 g of methacrylic acid and 43.749 g of a solution of NaOH concentrated to 30% by weight. The neutralization of the methacrylic acid was carried out into an ice-bath. 25 g of a 50% b.w. aqueous solution of the monomer 2-hydroxyethyl methacrylate (HEMA-PEG of the company Sigma-Aldrich, MW=2,000 Da, 42 polyoxyethylene units), 0.379 g of N,N'-methylen-bis-acrylamide and 0.253 g of ammonium persulfate (radical initiator) were added to the solution of methacrylic acid neutralized. To this aqueous phase, 16.164 g of an aqueous solution containing 33.33% b.w. of Dowfax 2A1 (steric anionic surfactant) was added.

The discontinuous aqueous phase was injected within the three-neck reactor, after that it was subjected to vacuum-nitrogen inerting cycles. The reaction was carried out for a total time of 3 hours at a temperature of 70° C.

The dispersion D1 showed to contain copolymer particles having an average diameter of about 15 micrometers.

Oily Phase Crossing Test

The efficacy of copolymer migration from the dispersion in organic solvent to a hydrocarbon oil and from the latter to an aqueous phase was assessed in the following manner.

Water (having the composition of "water-2" of example 1), an hydrocarbon oil (retrieved by an extraction well) and the copolymer dispersion were introduced into a vial having a height equal to 7 cm and a diameter equal to 2 cm, so as to make the overlap of three layers in the following order (from the top downwards): emulsion/oil/water.

The ratio by weight of the emulsion/oil/water is 1:1:1. The test was carried out at room temperature and 90° C. in static conditions (without stirring).

At room temperature it was observed that the polymer particles sediment through the oil up to come into contact with water within about 5 hours.

At 90° C., the time necessary for crossing oil was minutes. Furthermore, it was observed that the copolymer particles cross the oil without any effect of dispersed or emulsified water absorption, possibly present in the latter, occurs.

Aging Tests

A portion of the dispersion D1 was introduced into a vial containing water-2 of example 1 in a weight ratio 1:1. After the contact between the dispersion and water, a significant increase of the aqueous phase viscosity, due to the crossing of the copolymer in this phase and the following water absorption, occurred.

The sample was kept into a stove at 90° C. for one week. At the end of the aging period in the stove, the sample maintained substantially unchanged its consistency.

Test of the Reversibility of the Water Adsorbing Effect

A portion of the dispersion D1 was introduced into a vial containing water-2 of example 1 in a weight ratio 1:1 so as to form a hydrogel.

Once the formation of the hydrogel was completed, hydrochloric acid was introduced into the vial up to achieve pH=2. Due to acid addition, a significant reduction of the aqueous phase viscosity was observed. The same behavior was observed following the addition of formic acid up to pH=2.

Use of Organic Solvent Polymer Dispersion within a Capillary.

The behavior of a treatment fluid into a fractured rock formation was stimulated by carrying out the following applicative test into a capillary tube.

A vial was filled with a sample of water-2 and brought to 90° C. Then, a glass capillary tube (inner diameter 2.5 mm and length 40 cm) was inserted into the vial in vertical direction, so as to immerge one end thereof under the water surface.

A sample of the dispersion D1 (8 mL) was then introduced into the capillary tube by a syringe. After hours, in the lower part of the tube, above the water level, the formation of a highly viscous phase having an height of about 2 cm was observed.

A second portion (8 mL) of the dispersion D1 was then injected into the capillary tube and it was observed that:
i. the viscous phase behaved as a plug, exerting a significant adherence on the capillary tube walls;
ii. the adherence was such that the injection of the second portion of the dispersion required the application of a certain pressure by the syringe;
iii. the second portion of the dispersion partially replaced the first one, causing the precipitation of a portion thereof in the vial;
iv. after two days, the presence of an aqueous phase above the hydrogel layer was observed;
v. the water block effect exerted from the viscous phase could be annulled by injecting formic acid or hydrochloric acid into the capillary tube.

EXAMPLE 3

A polymer dispersion prepared according to the previous Example 2 was tested in the treatment of an open-hole partially depleted well in a partially fractured reservoir, for reducing the water production associated with the extraction of oil.

The well depth was about 3000 m. Total volume of the well: 19 m$^3$. Well bottom temperature 95-100° C. The well was equipped with an artificial lift pumping system Thomassen 5 holes. The average production conditions before the treatment of the oil well were as follows:
Oil: 5 m$^3$/d
Water: 20 m$^3$/d
Flux: 6 m$^3$/d The volumetric water content [Water Cut:(volume of produced water)/(total produced volume)] was 65%.

20 m$^3$ of a polymer dispersion were prepared on a discontinuous pilot scale by using the same reagents in the same proportions and the same procedure as in the previous Example 2. The solid (polymer) content of the dispersion was 25% b.w. The average particle size was about 15 micrometers.

The well production was stopped and the following fluids were pumped in bullheading (with a high pressure pumping equipment) in sequence:
1. 10 m$^3$ of dry light gasoil (average boiling point 170° C., density 0.907 g/cc, water content <500 ppm b.w.) for displacing water;
2. 16 m$^3$ of the polymer dispersion prepared according to the procedure of example 2;
3. 20 m$^3$ of dry light gasoil as in step 1 for displacing the polymer dispersion into the reservoir.

After the injection of the fluids the well was maintained in shut-in for 50 hours before starting the extraction again, in order to allow the polymer particles to settle and get in contact with the water in the reservoir and to swell.

The well production was started again. After about 20 days the well production had stabilized to a total production rate of about 60 m$^3$/d with a Water Cut of about 40% (20% decrease with respect to the initial conditions before treatment). The overall average oil production increased to 30 m$^3$/d. The same production characteristics have been maintained for over 1 year.

Thus the method according to the invention resulted very effective in practice in enhancing the oil recovery and reducing the water production in a partially depleted oil well.

The invention claimed is:

1. A method for inhibiting permeation of water in an extraction well of a hydrocarbon fluid from an underground reservoir, the method comprising:
    injecting into said underground reservoir, at least one treatment fluid comprising at least one inverse emulsion or one dispersion in an organic solvent of at least one copolymer obtained from
    at least one first monomer selected from the group consisting of an acrylic monomer and a methacrylic monomer, and
    a second monomer of formula (I)

wherein:
$R_1$ is H or $CH_3$;
$R_2$ is H, a $C_1$-$C_4$ alkyl or an acrylate group $COCR_3$=$CH_2$ wherein $R_3$ is H or $CH_3$;
X is O or NH; and n is an integer ranging from 4 to 500;
wherein
the organic solvent has a water solubility at 25° C. lower than or equal to 5 g/L and a solubility in oil at 25° C. equal to or higher than 100 g/Ls,
the ratio between the weight of the second monomer and the weight of the first monomer is at least 5%, and
the discontinuous phase of said inverse emulsion is in the form of dispersed drops/droplets containing said copolymer.

2. The method according to claim 1, wherein
$R_1$ is $CH_3$;
$R_2$ is H or a $C_1$-$C_4$ alkyl,
X is O; and
n is an integer ranging from 4 to 50.

3. The method according to claim 1, wherein said second monomer has a molecular weight of 200-10,000 Da.

4. The method according to claim 1, wherein said at least one first monomer is selected from the group consisting of acrylic acid and methacrylic acid.

5. The method according to claim 4, wherein said acrylic acid or methacrylic acid is at least partially neutralized with metal ions.

6. The method according to claim 1, wherein said copolymer is cross-linked.

7. The method according to claim 1, wherein said treatment fluid comprises a water-in-oil emulsion of said at least one copolymer in said organic solvent, wherein said at least one copolymer is in the form of particles having an average diameter of 10-500 nanometres.

8. The method according to claim 1, wherein said treatment fluid comprises a dispersion of said at least one copolymer in said organic solvent, wherein said at least one copolymer is in the form of particles having an average diameter of 1-1,000 micrometers.

9. The method according to claim 1, wherein a weight ratio of said second monomer to said at least one first monomer ranges from 5% to 50%.

10. The method according to claim 1, wherein said organic solvent is at least one selected from the group consisting of an aliphatic or aromatic $C_6$-$C_{25}$ hydrocarbon solvent; an amide having a total number of carbon atoms ranging from 7 to 25; an alcohol having a total number of carbon atoms ranging from 7 to 25; an ether having a total number of carbon atoms ranging from 7 to 25; an ester having a total number of carbon atoms ranging from 7 to 25; and a ketone having a total number of carbon atoms ranging from 7 to 25.

11. The method according to claim 1, further comprising:
after said injecting the at least one treatment fluid into said underground reservoir, injecting at least one displacement fluid into said underground reservoir for one or more times.

12. The method according to claim 1, further comprising:
extracting said hydrocarbon fluid from said underground reservoir.

13. The method according to claim 1, wherein said hydrocarbon fluid is a hydrocarbon oil.

14. An emulsion or a dispersion in an organic solvent of at least one copolymer of
at least one first monomer selected from the group consisting of an acrylic monomer and a methacrylic monomer, and
a second monomer of formula (I)

wherein:
$R_1$ is H or $CH_3$;
$R_2$ is H, a $C_1$-$C_4$ alkyl or an acrylate group $COCR_3$=$CH_2$ wherein $R_3$ is H or $CH_3$;
X is O or NH; and
n is an integer ranging from 4 to 500;
wherein
the ratio between the weight of the second monomer and the weight of the first monomer is at least 5%,
the organic solvent has a water solubility at 25° C. lower than or equal to 5 g/L and a solubility in oil at 25° C. equal to or higher than 100 g/Ls, and
when an emulsion is present, the emulsion is an inverse emulsion.

* * * * *